(12) United States Patent
Choi

(10) Patent No.: US 8,442,455 B2
(45) Date of Patent: May 14, 2013

(54) MOBILE TERMINAL AND TERMINAL SYSTEM HAVING THE SAME

(75) Inventor: Byungsung Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 12/945,797

(22) Filed: Nov. 12, 2010

(65) Prior Publication Data

US 2012/0004000 A1 Jan. 5, 2012

(30) Foreign Application Priority Data

Jun. 30, 2010 (KR) ........................ 10-2010-0063044

(51) Int. Cl.
*H04Q 7/20* (2006.01)

(52) U.S. Cl.
USPC ........................ 455/90.3; 455/573; 320/115

(58) Field of Classification Search .................. 455/507, 455/90.3, 573, 575.1, 343.1–2, 343.5; 320/115
See application file for complete search history.

(56) References Cited

U.S. PATENT DOCUMENTS

| | | | | |
|---|---|---|---|---|
| 7,062,300 | B1 * | 6/2006 | Kim | 455/569.1 |
| 7,257,429 | B2 * | 8/2007 | Kogan | 455/573 |
| 7,415,292 | B2 * | 8/2008 | Park et al. | 455/573 |
| 7,483,679 | B2 * | 1/2009 | Kurobe et al. | 455/90.3 |
| 7,805,163 | B2 * | 9/2010 | Namatame et al. | 455/556.1 |
| 2004/0097274 | A1 * | 5/2004 | Schlegel | 455/569.2 |
| 2004/0110544 | A1 * | 6/2004 | Oyagi et al. | 455/575.1 |
| 2005/0117951 | A1 * | 6/2005 | Silverbrook | 400/88 |
| 2006/0035124 | A1 * | 2/2006 | Takei | 429/26 |
| 2006/0248251 | A1 * | 11/2006 | Tracy et al. | 710/303 |
| 2009/0036158 | A1 * | 2/2009 | Fujinawa et al. | 455/556.1 |
| 2012/0021780 | A1 * | 1/2012 | Okuda | 455/458 |

* cited by examiner

*Primary Examiner* — Cong Tran
(74) *Attorney, Agent, or Firm* — Birch, Stewart, Kolasch & Birch, LLP

(57) ABSTRACT

A mobile terminal including a body having a battery configured to be mounted on a cradle, a first connection port disposed at one surface of the body to be electrically connected to power supply terminals of the cradle if the body is mounted on the cradle, a second connection port disposed at another surface different from the one surface of the body to be covered by at least part of the cradle if the body is mounted on the cradle, and a power supply path for electrically connecting the battery to the first and the second connection port respectively to charge the battery if power is supplied to the first and the second connection port.

17 Claims, 11 Drawing Sheets

MOBILE TERMINAL AND TERMINAL SYSTEM HAVING THE SAME

CROSS REFERENCE TO RELATED APPLICATION

Pursuant to 35 U.S.C. §119(a), this application claims the benefit of earlier filing date and right of priority to Korean Application No. 10-2010-0063044, filed on Jun. 30, 2010, the contents of which is incorporated by reference herein in its entirety.

BACKGROUND OF THE INVENTION

1. Field of the Invention

The present disclosure relates to a mobile terminal capable of charging a battery in a state of being mounted on a cradle and a terminal system having the same.

2. Description of the Conventional Art

Terminals can be classified into two types, such as a mobile terminal and a stationary terminal based on its mobility. Furthermore, the mobile terminal can be further classified into two types, such as a handheld terminal and a vehicle mount terminal based on whether or not it can be directly hand-carried by a user.

Multifunctional terminals are capable of capturing still images or moving images, playing music or video files, playing games, receiving a broadcast and the like, and can be implemented as or with an integrated multimedia player.

In order to implement a complex function such as a multimedia player, various attempts at user management have been applied in the conventional art via hardware and/or software. As an example, various user interface environments have been provided for the user to easily or conveniently retrieve or select a function.

Furthermore, a fixed-mobile convergence (FMC) service has recently been provided to utilize wired and wireless communication networks with a terminal in a mobile manner as a mobile terminal is regarded as a personal belonging. Accordingly, a mobile terminal has been recently developed to be used as an Internet phone at home or office, and as a mobile phone out of home or office.

The conventional Internet phone is charged while being mounted on a cradle at home or office, but on the contrary, the conventional mobile phone is charged as it is connected to an external port through a connection port. As a result, when a conventional mobile terminal having a fixed-mobile convergence function is formed to be charged by both the two methods, there will arise a double charge problem such that power is supplied at the same time by the two methods.

SUMMARY OF THE INVENTION

The present disclosure presents information for solving the foregoing problem and other problems with the conventional art, thereby implementing a charging mechanism with excellent reliability in a mobile terminal having a fixed-mobile convergence function.

Furthermore, the present disclosure describes a mobile terminal and a terminal system having the same in which charging is possible with a plurality of methods, but double charge can be limited.

In order to accomplish the foregoing objective, a mobile terminal associated with the present invention may include a body having a battery configured to be mounted on a cradle, a first connection port disposed at one surface of the body to be electrically connected to power supply terminals of the cradle if the body is mounted on the cradle, a second connection port disposed at another surface different from the one surface of the body to be covered by at least part of the cradle if the body is mounted on the cradle, and a power supply path for electrically connecting the battery to the first and the second connection port respectively to charge the battery if power is supplied to the first and the second connection port.

As another example associated with the present invention, the body may include a front surface portion, a rear surface portion, and a lateral surface portion, and the first and the second connection port may be disposed at one surface and the other surface of the lateral surface portion, respectively. A first antenna formed to transmit or receive radio signals may be mounted on the body, and the first antenna may be disposed between the first and the second connection port along the lateral surface portion.

As another example associated with the present invention, one surface and the other surface of the lateral surface portion may face the opposite direction to each other, and the first antenna may be disposed adjacent to a surface intersected by one surface and the other surface of the lateral surface portion, respectively. The first antenna may be configured to transmit and/or receive radio signals to and/or from a first base station, and a second antenna formed to transmit and/or receive radio signals to and/or from a second base station may be mounted on the body, and the second antenna may be disposed adjacent to the other surface of the lateral surface portion.

As another example associated with the present invention, a window and a keypad for receiving control commands may be disposed at the front surface portion, and the battery may be mounted on the rear surface portion, and the first antenna may be formed to be deviated from the keypad and battery in a direction passing from the front surface portion to the rear surface portion. A through hole through which the first connection port is passed may be formed on the lateral surface portion to expose the first connection port to the outside.

As another example associated with the present invention, the body may be formed to be mounted on a mounting portion recessed at the body of the cradle, and one surface of the lateral surface portion may be accommodated in the mounting portion and the second connection port may be formed to be covered by a cover portion protruded from the body of the cradle if the body is mounted on the mounting portion.

As another example associated with the present invention, the first connection port may be exposed to the outside at one surface of the body, and the second connection port may be formed to be opened or closed by a port cover mounted on the other surface of the body. The port cover may be formed such that opening or closing thereof is limited by at least part of the cradle if the body is mounted on the cradle.

Furthermore, a mobile terminal according to the present invention may include a body having a battery formed to be mounted on a cradle, a first connection port disposed at one surface of the body to be electrically connected to the battery along a first power supply path, a second connection port electrically connected to the battery along a second power supply path, and disposed at another position different from the first connection port, and a power supply control device formed to cut off the second power supply path if the body is mounted on the cradle or to cut off the second power supply path if power is supplied to the first connection port.

As another example associated with the present invention, the power supply control device may include a detection unit, a switching unit, and a controller. The detection unit may be formed to detect that the body is mounted on the cradle. The switching unit may be disposed on the second power supply path to be switched to connect or disconnect the power supply. The controller may be connected to the detection unit and the switching unit to control the switching unit to cut off the second power supply path if mounting to the cradle of the body is detected. The detection unit may include a detection sensor mounted on the body to generate a detection signal if a magnet mounted on the cradle approaches.

As another example associated with the present invention, the power supply control device may include a cut-off switch. The cut-off switch may be exposed on a surface of the body and disposed on the second power supply path to be switched to cut off the second power supply path if pressure is applied. The cradle may be formed to press the cut-off switch if the body is mounted thereon.

As another example associated with the present invention, the power supply control device may include a signal generation unit configured to generate a supply signal if power is supplied to the first connection port, a switching unit disposed on the second power supply path to connect or disconnect the power supply, and a controller connected to the signal generation unit and the switching unit to control the switching unit to cut off the second power supply path if the supply signal is received.

As another example associated with the present invention, a monitoring unit may be configured on the body to monitor battery charge and electrically connected to the battery, and the first and the second power supply path may be formed to be connected from the first and the second connection port to the monitoring unit, respectively. The mobile terminal may include an integrated power controller. The integrated power controller may be connected to electronic elements mounted on the body to control power supply to the electronic elements. The monitoring unit may transfer power supplied through either one of the first and the second power supply path to the integrated power controller.

As another example associated with the present invention, a first antenna may be mounted on the body to transmit or receive radio signals, and the first antenna may be disposed to be deviated from a region adjacent to a surface at which the first connection port is disposed.

In addition, according to the present invention, there is proposed a terminal system including a mobile terminal having a battery formed to perform radio communication, and a cradle configured to mount the terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3b is a rear perspective view illustrating a mobile terminal illustrated in FIG. 3a;

DETAILED DESCRIPTION OF THE INVENTION

Hereinafter, a mobile terminal associated with the present invention will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include a portable phone, a smart phone, a laptop computer, a digital broadcast terminal, a personal digital assistant (PDA), a portable multimedia player (PMP), a navigation, and the like.

Figure 1:
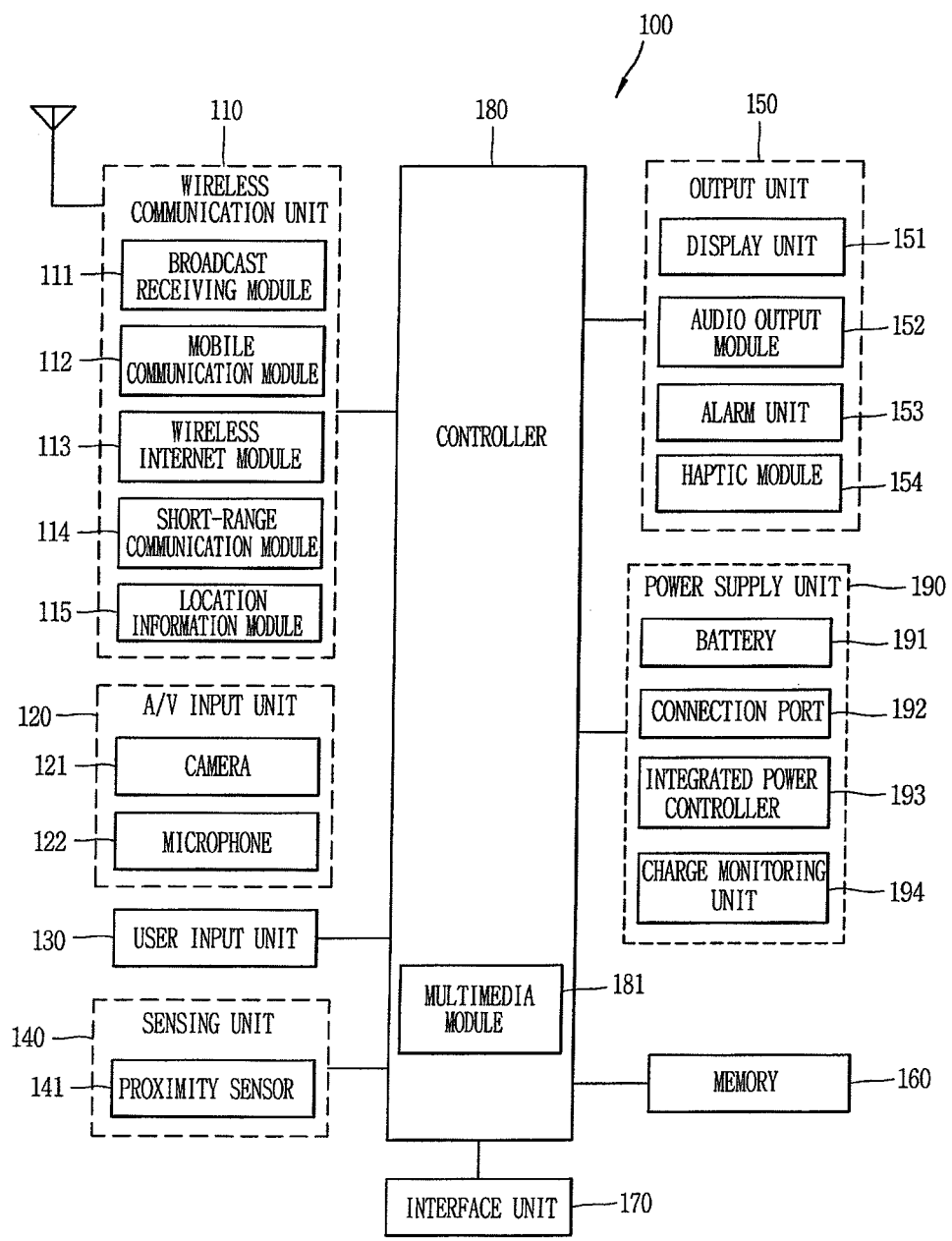
FIG. 1 is a block diagram illustrating a mobile terminal associated with an embodiment of the present invention.

FIG. 1 is a block diagram illustrating a mobile terminal associated with an embodiment of the present invention.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In case where the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

The power supply unit 190 may include, for example, a battery 191, a connection port 192, a power supply controller 193, and a charge monitoring unit 194.

The battery 191 may be, for example, a built-in type battery configured to be charged, and may be detachably combined with a terminal body for charging or the like.

The connection port 192 may be configured as an example of the interface 170, which is electrically connected an external charger supplying power for battery charge. The connection port 192 may be a path through which power from an external cradle is supplied to the mobile terminal 100 when the mobile terminal 100 is connected to the cradle, or may be a path through which various command signals inputted from the cradle by the user is transmitted to the mobile terminal. Various command signals or power inputted from the cradle may be operated as a signal for recognizing that the mobile terminal is correctly mounted on the cradle.

The power supply controller 193 is connected to the battery 191 to supply power to main elements of the terminal, for example, the controller 180, the memory 160, and the wireless communication unit 110.

The charge monitoring unit 194 transfers power supplied from the connection port 192 to the battery 191, and the charge monitoring unit 194 is configured to transmit information for charging current by recognizing the level of the charging current.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, referring to FIG. 2, a communication system in which a terminal associated with the present invention is operable will be described.

A communication system may use different wireless interfaces and/or physical layers. For example, a wireless that can be used by a communication system may include Frequency Division Multiple Access (FDMA), Time Division Multiple Access (TDMA), Code Division Multiple Access (CDMA), Universal Mobile Telecommunications Systems (UMTS) (particularly, Long Term Evolution(LTE)), Global System for Mobile Communications (GSM), and the like. Hereinafter, for the sake of convenience of explanation, it will be described to be limited to CDMA. However, it is apparent that the present invention may be applicable to all kinds of communication systems including a CDMA wireless communication system.

Figure 2:
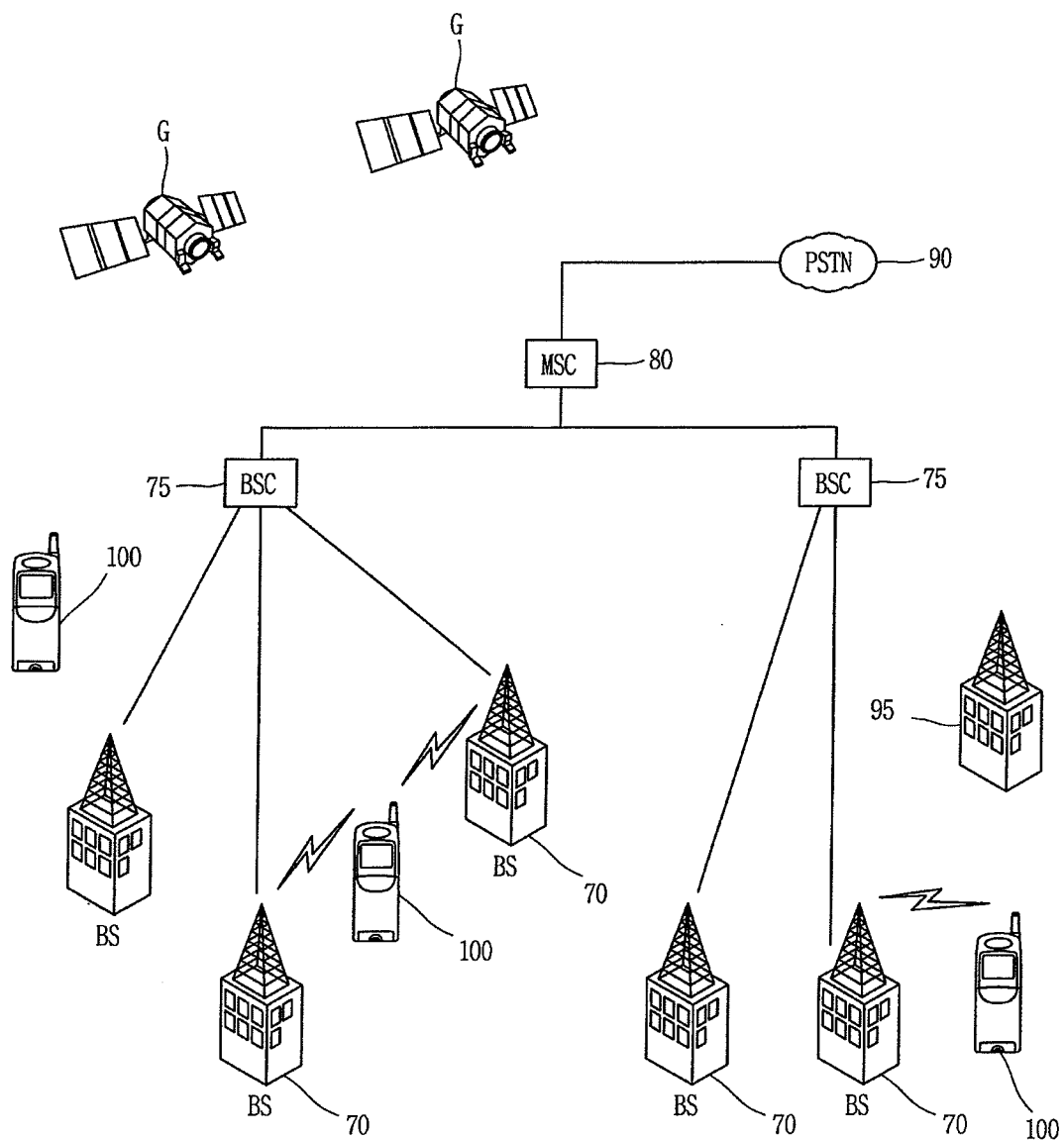
FIG. 2 is a conceptual view illustrating a communication system in which a terminal associated with the present invention can be operated.

As illustrated in FIG. 2, a CDMA communication system is configured to be connected to a plurality of terminals 100, a plurality of base stations (BSs) 70, a plurality of base station controllers (BSCs) 75, and a mobile switching center (MSC) 80. The MSC 80 is configured to be connected to a public switched telephone network (PSTN) 90, and also configured to be connected to BSCs 75. The BSCs 75 may be connected to BSs 70 in pairs through a backhaul line. The backhaul line may be provided with at least one of E1/T1, ATM, IP, PPP, Frame Relay, HDSL, ADSL, and xDSL.

Each BS 70 may include at least one sector, and each sector may include an omni-directional antenna or an antenna directing a specific radial direction from the BS 70. Alternatively, each sector may include two or more antennas in various shapes. Each BS 70 may also be configured to support allocation of a plurality of frequencies in which each frequency allocation has a specific spectrum (for example, 1.25 MHz, 5 MHz, etc.).

An intersection between the sector and the frequency allocation may be referred to as a CDMA channel. The BSs 70 may also be referred to as Base Station Transceiver Subsystems (BTSs). In this case, the term "base station" may refer to a combination of one BSC 75 and at least one BS 70. The base station may also designate a "cell site". Alternately, each of the sectors with respect to a specific BS 70 may be referred to as a plurality of cell sites.

Any one of the plurality of BSs 70 may be a modem in an Internet phone performing communication using Internet at home or office, or may be a base station or wireless router in a local area network (for example, wireless LAN) using radio waves or an infrared transmission method. As a result, a fixed-mobile convergence (FMC) service can be implemented to utilize wired and wireless communication networks with a terminal in a mobile manner.

As illustrated in FIG. 2, a Broadcasting Transmitter (BT) 95 serves to transmit a broadcast signal to the terminals 100 operating in the system. The broadcast receiving module 111 illustrated in FIG. 1 is provided in the terminal 100 so as to receive the broadcast signal transmitted by the BT 95.

Moreover, FIG. 2 illustrates multiple Global Positioning System (GPS) satellites (G). The satellites (G) serve to detect a position of at least one of the multiple terminals 100. Two satellites are illustrated in FIG. 2, however, useful position information may be obtained by more or less than two satellites. The GPS module 115 illustrated in FIG. 1 cooperates with the satellites (G) so as to obtain desiring position information. Here, the module 115 can track the position using all techniques allowing to track positions, as well as the GPS tracking technology. Also, at least one of the GPS satellites (G) may handle satellite DMB transmission alternatively or additionally.

Among typical operations of a wireless communication system, a BS 70 serves to receive reverse link signals from various terminals 100. At this time, the terminal 100 is connecting a call, transmitting and/or receiving a message or executing other communication operations. Each reverse link signal received by a specific base station 70 is processed within the specific BS 70. Data generated resulting from the processing is transmitted to the connected BSC 75. The BSC 75 serves to allocate a call resource and manage mobility, including systemization of soft handoffs between the BSs 70. Also, the BSC 75 transmits the received data to the MSC 80, and then the MSC 80 provides an additional transmission service so as to be connected to a PSTN 90. Similarly, the PSTN 90 is connected to the MSC 80 and the MSC 80 is connected to the BSCs 75, and the BSCs 75 control the BSs 70 so as to transmit forward link signals to the terminals 100.

Figure 3A:
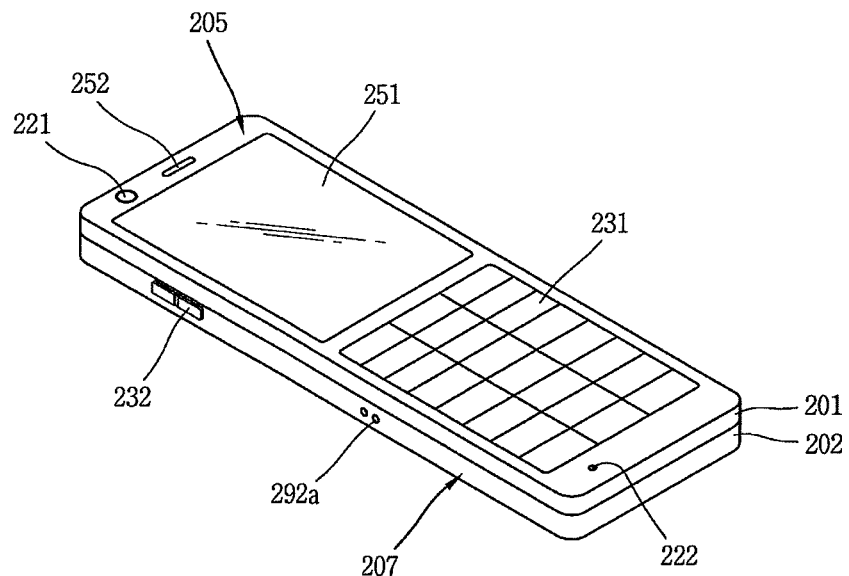
FIG. 3a is a front perspective view illustrating a mobile terminal associated with the present invention.
Figure 3B:
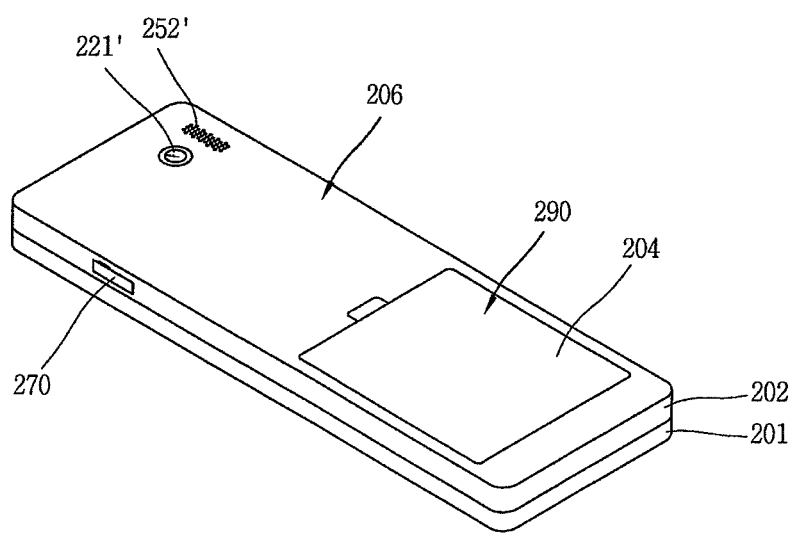

FIG. 3a is a front perspective view illustrating a mobile terminal associated with the present invention, and FIG. 3b is a rear perspective view illustrating a mobile terminal illustrated in FIG. 3a.

The main terminal 200 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 201 and a rear case 202. At least one intermediate case may be additionally disposed between the front case 201 and the rear case 202.

The cases may be formed by injection-molding a synthetic resin or may be also formed of a metal material such as stainless steel (STS), titanium (Ti), or the like.

A display unit 251, an audio output module 252, a camera 221, a user input unit 231, 232, a microphone 222, and the like may be arranged on the terminal body, mainly on the front case 201.

The display unit 251 occupies a most portion of the front case 201. The audio output unit 252 and the camera 221 are disposed on a region adjacent to one of both ends of the display unit 251, and the user input unit 231 and the microphone 222 are disposed on a region adjacent to the other end thereof. The user interface 232 and the interface 270, and the like, may be disposed on a lateral surface of the front case 201 and the rear case 202.

The user input unit is manipulated to receive a command for controlling the operation of the portable terminal 200, and may include a plurality of manipulation units 231, 232. The manipulation units 231, 232 may be commonly designated as a manipulating portion, and any method may be employed if it is a tactile manner allowing the user to perform manipulation with a tactile feeling.

The content inputted by the manipulation units 231, 232 may be set in various ways. For example, the first manipulation unit 231 may be used to receive a command, such as start, end, scroll, 3D browser execution, or the like, and the second manipulation unit 232 may be used to receive a command, such as controlling a volume level being outputted from the audio output unit 252, or switching it into a touch recognition mode of the display unit 251. The display unit 251 together with a touch sensor may form a touch screen, and the touch screen may be an example of the user input unit.

As illustrated in the drawing, a first connection port 292a electrically connected to power supply terminals 330 (see FIG. 6) of the cradle 300 may be disposed at one surface of a body of the terminal 200.

The first connection port 292 may be a path through which power from the cradle 300 is supplied to the mobile terminal 200 when the mobile terminal 200 is connected to the cradle 300.

Referring to FIG. 3b, a camera 221' may be additionally mounted on a rear surface of the terminal body, namely, the rear case 202. The camera 221' has an image capturing direction, which is substantially opposite to the direction of the camera 221 (refer to FIG. 3a), and may have different pixels from those of the first video input unit 221.

For example, it is preferable that the camera 221 has a relatively small number of pixels enough not to cause a difficulty when the user captures his or her own face and sends it to the other party during a video call or the like, and the camera 221' has a relatively large number of pixels since the user often captures a general object that is not sent immediately. The cameras 221, 221' may be provided in the terminal body in a rotatable and popupable manner.

Furthermore, a flash and a mirror (not shown) may be additionally disposed adjacent to the camera 221'. The flash illuminates light toward an object when capturing the object with the camera 221'. The mirror allows the user to look at his or her own face, or the like, in a reflected way when capturing himself or herself (in a self-portrait mode) by using the camera 221'.

Furthermore, an audio output unit 252' may be additionally disposed on a rear surface of the terminal body. The audio output unit 252' together with the audio output unit 252 (refer to FIG. 3a) can implement a stereo function, and it may be also used to implement a speaker phone mode during a phone call.

Furthermore, an antenna for receiving broadcast signals may be additionally disposed on a lateral surface of the terminal body. The antenna constituting a broadcast receiving module 111 (refer to FIG. 1) may be provided so as to be pulled out from the terminal body.

Furthermore, a power supply unit 290 for supplying power to the portable terminal 200 may be mounted on a rear surface of the terminal body. The power supply unit 290 may be configured so as to be incorporated in the terminal body, or directly detachable from the outside of the terminal body.

A touch sensor for detecting a touch may be additionally mounted on the rear case 202. The touch sensor may be configured in an optical transmission type similarly to the display unit 251. In this case, if the display unit 251 is configured to output visual information from both sides of the display unit 251, then the visual information may be also recognized through the touch sensor. The information being outputted from the both sides thereof may be controlled by the touch sensor. Alternatively, a display may be additionally mounted on the touch sensor, and a touch screen may be also disposed on the rear case 202.

An interface 270 may be disposed at a lateral surface of the terminal, and the interface 270 may include a second connection port 292b (refer to FIG. 5), which is electrically connected to an external charger supplying power for charging the battery 291.

The mobile terminal 200 according to the present invention may include a mechanism for preventing double charge that can be occurred by the first and the second connection port 292a, 292b. Hereinafter, referring to FIGS. 4 through 7, a double charge prevention mechanism will be described in more detail.

Figure 4:
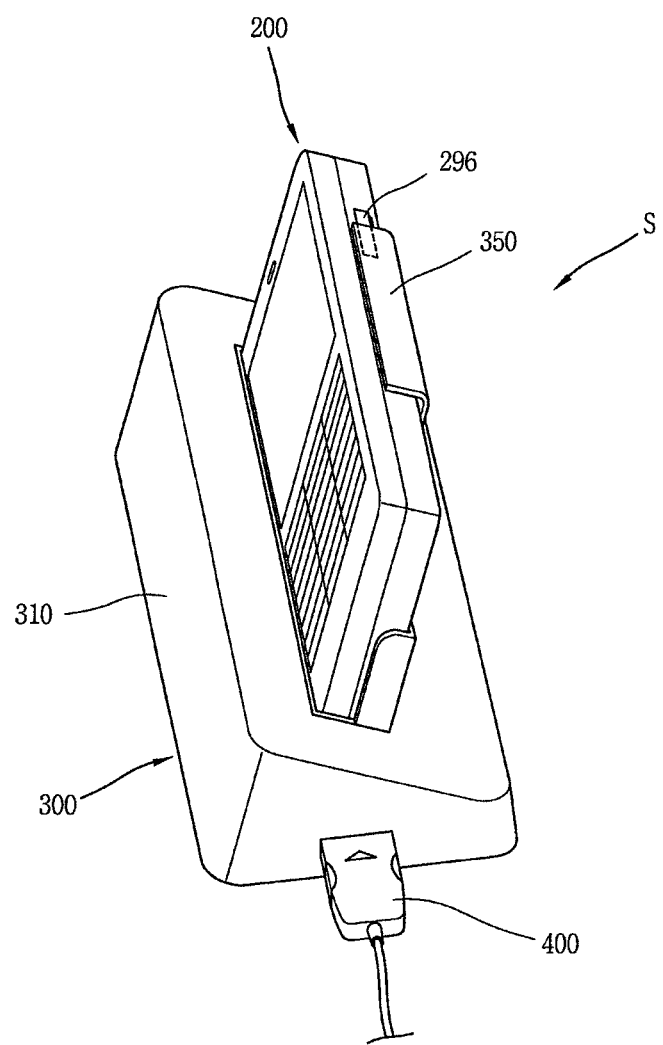
FIG. 4 is a perspective view illustrating that a mobile terminal in FIG. 3a is mounted on a cradle.
Figure 5:
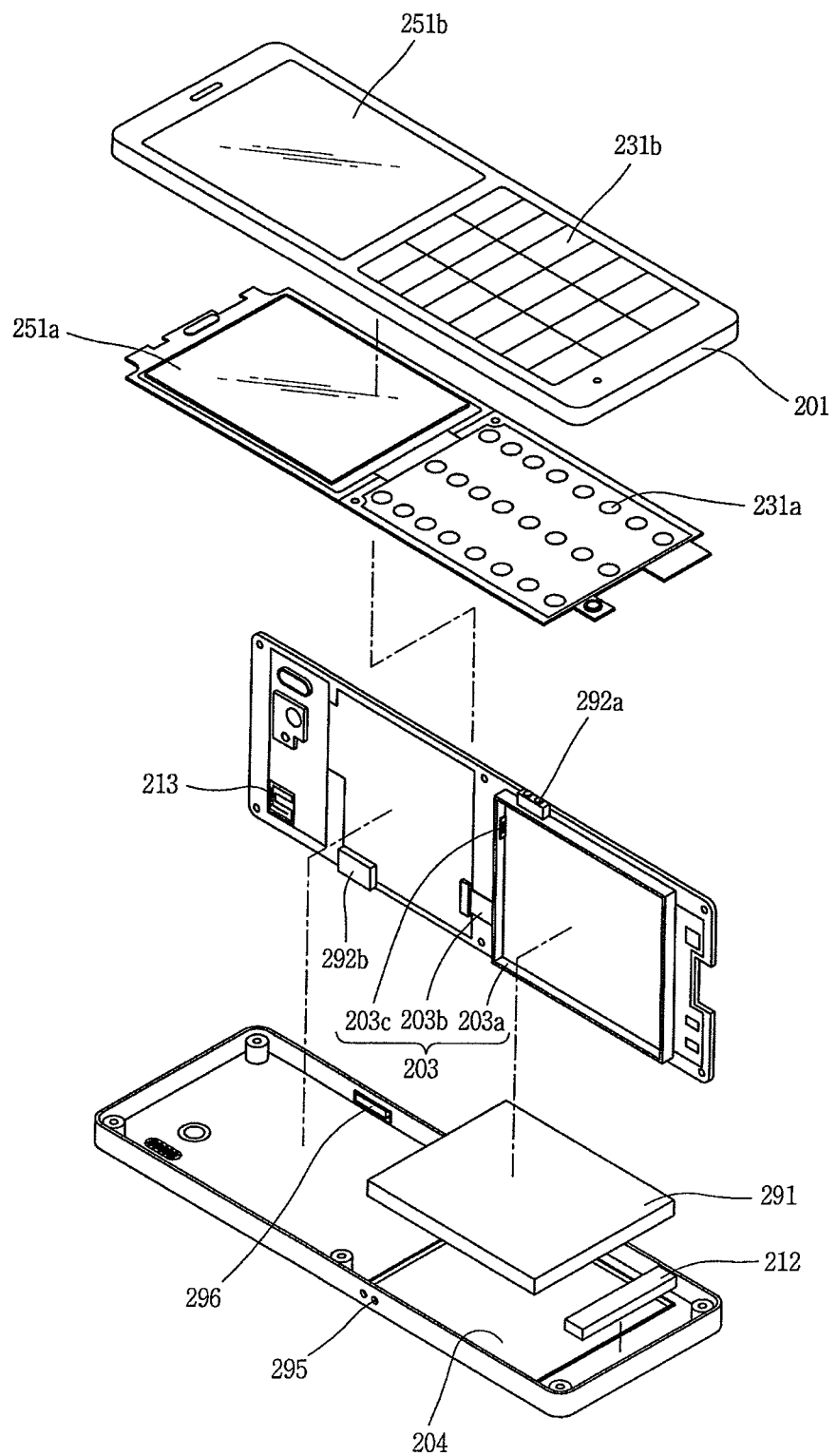
FIG. 5 is an exploded view illustrating a mobile terminal in FIG. 4b.
Figure 6:
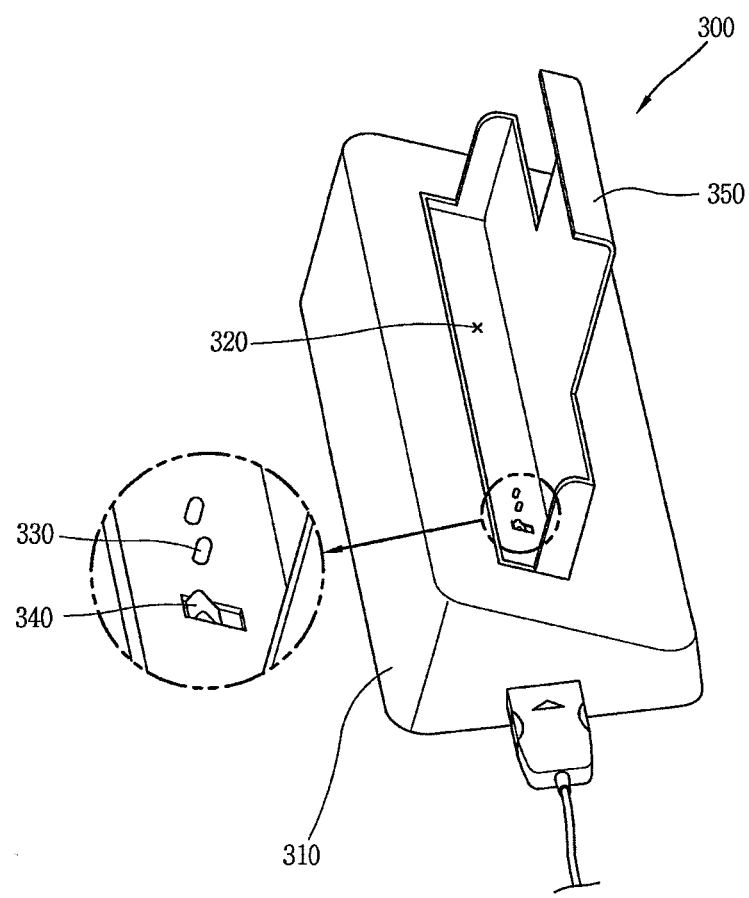
FIG. 6 is an enlarged view illustrating a mounting portion of the cradle illustrated in FIG. 4.
Figure 7:
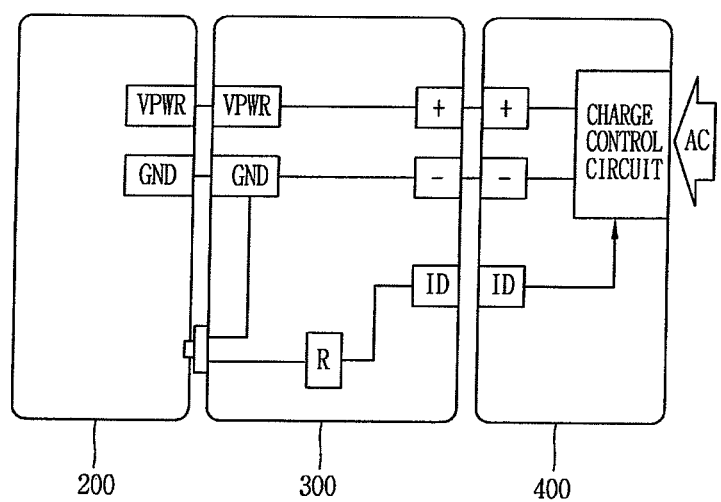
FIG. 7 is a conceptual view illustrating the charging operation for a mobile terminal and a cradle in FIG. 4.

FIG. 4 is a perspective view illustrating that a mobile terminal in FIG. 3a is mounted on a cradle, and FIG. 5 is an exploded view illustrating a mobile terminal in FIG. 3b, and FIG. 6 is an enlarged view illustrating a mounting portion of the cradle illustrated in FIG. 4, and FIG. 7 is a conceptual view illustrating the charging operation for a mobile terminal and a cradle in FIG. 4.

Referring to FIGS. 4 and 6, the mobile terminal 200 is configured to be mounted on the cradle 300 to receive power for charging from the cradle 300.

The cradle 300 may include a body 310, a mounting portion 320, and power supply terminals 330.

The mounting portion 320 may be configured to be recessed at the body 310 of the cradle, and the at least part of the mobile terminal 200 may be formed to be accommodated in the mounting portion 320. More specifically, one lateral surface of the mobile terminal 200 may be inserted in the mounting portion 320, and the mounting portion 320 may be configured to support the inserted mobile terminal 200.

The power supply terminals 330 may be disposed at the mounting portion 320, and configured to be connected to the first connection port 292a of the mobile terminal if the body of the mobile terminal 200 is mounted on the mounting portion 320. A mechanical press switch 340 is disposed adjacent to the power supply terminals 330, and the press switch 340 is configured to switch the connection between the ground (GRD) and a resistor (R).

The cradle 300 is connected to a charger 400, and the current supplied form the charger 400 is passed through the cradle 300 to flow to the first connection port 292.

Referring to FIG. 7, if the mobile terminal 200 is mounted on the mounting portion 320, then the body of the mobile terminal presses the press switch 340. By this, the charger 400 recognizes an ID resistor through the ID line and then recognizes the level of VPWR, thereby causing a proper current to flow to enable charging.

Referring to FIG. 5, a circuit board 231a is mounted on the rear case 202. The circuit board 231a may be configured as an example of the controller 180 (refer to FIG. 1) to perform various functions of the mobile terminal.

Electronic elements such as a display module 251a and a switch 231 may be mounted on the circuit board 231a, and the electronic elements are configured to receive power from the battery 291.

A receiving portion 203 with a recessed shape is formed on the rear case 202 to accommodate the battery 291. The receiving portion 203 is configured to accommodate the battery 291 as well as to electrically connect the battery 291 to the circuit board 231a. For example, the receiving portion 203 may include a rim 203a surrounding the battery 291, and a flexible circuit board 203b extended from the rim 203a to be connected to the circuit board 231a.

The battery 291 is formed to be charged, and may be detachably combined with the receiving portion 203. The battery 291 mounted on the mobile terminal may be covered by a battery cover 204. The receiving portion 203 may include connection terminals 203c connected to the battery 291 to supply electricity to at least one element in the mobile terminal.

As illustrated in the drawing, the terminal body may include a front surface portion 205, a rear surface portion 206, and a lateral surface portion 207 (refer to FIGS. 3a and 3b). More specifically, a window 251b and a keypad 231b for receiving control commands are disposed at the front surface portion 205, and the battery is mounted on the rear surface portion 206, and the first and the second connection port 292a, 292b are disposed at the lateral surface portion 207.

The first and the second connection port 292a, 292b are disposed at one surface and the other surface of the lateral surface portion 207, respectively. For example, the first and the second connection port 292a, 292b may be disposed at lateral surfaces facing the opposite direction to each other, i.e., lateral surfaces formed in a lengthwise direction of the terminal, and a lateral surface disposed with the first connection port 292a may be accommodated in the mounting portion 320 of the cradle 300.

The first connection port 292a is disposed at the receiving portion 203. More specifically, the first connection port 292a may be mounted on the rim 203a to be connected to the battery 291 and exposed to the outside by passing through a through hole 295 at a lateral surface of the terminal.

The second connection port 292b is mounted on the circuit board 231a, and formed to be opened or closed by a port cover 296 mounted on the rear case 202.

If power is supplied to the first and the second connection port 292a, 292b, then the first and the second connection port 292a, 292b are electrically connected to the battery 291, respectively, through a power supply path (not shown) to charge the battery 291.

The power supply path of the first connection port 292a may be, for example, an electrical wiring that connects the first connection port 292a, the flexible circuit board 203b, the circuit board 231a, the flexible circuit board 203b, and the connection terminals 203c. The power supply path of the second connection port 292b may be, for example, an electrical wiring that connects the second connection port 292b, the circuit board 231a, the flexible circuit board 203b, and the connection terminals 203c.

A first antenna 212 formed to transmit or receive radio signals is mounted on the rear case 202. The first antenna 212 may be disposed between the first and the second connection port 292a, 292b along the lateral surface portion 207. More specifically, the first antenna 212 is disposed adjacent to a surface intersected by one surface and the other surface of the lateral surface portion 207, respectively.

For example, the carrier and radiation pattern of the first antenna 212 may be disposed adjacent to a lateral surface formed in a widthwise direction of the terminal, and may be electrically connected to the circuit board 231a. Furthermore, the first antenna 212 may be formed to be deviated from the keypad 231b and battery 291 in a direction passing from the front surface portion 205 to the rear surface portion 206. In this manner, the first antenna 212 is formed to be deviated from the first and the second connection port 292a, 292b, keypad 231b and battery 291, and the like, thereby enhancing the performance of the antenna. Furthermore, referring to FIGS. 4 and 5, the first antenna 212 is located to be deviated from the mounting portion 320 in a state that the terminal body is mounted on the cradle 300. As a result, the performance of transmitting or receiving radio signals in a terminal can be maintained even when the terminal is mounted on the cradle 300.

The first antenna 212 may be configured to transmit and/or receive radio signals to and/or from a first base station, and a second antenna 213 formed to transmit and/or receive radio signals to and/or from a second base station is mounted on the terminal body. The second antenna 213 is formed to transmit or receive local radio signals, and according to the drawing, the second antenna 213 is disposed adjacent to the other surface (i.e., a surface disposed with the second connection port) of the lateral surface portion 207. The second antenna 213 is located to be deviated from the mounting portion 320 in a state that the terminal body is mounted on the cradle 300. As a result, the performance of transmitting or receiving local radio signals in a terminal can be maintained even when the terminal is mounted on the cradle 300.

Referring to FIGS. 4 and 6, if the body of the terminal 200 is mounted on the mounting portion 320, then the second connection port 292b will be covered by a cover portion 350 protruded from the body 310 of the cradle. If the body of the terminal 200 is mounted on the cradle 300, then the port cover 296 is formed such that opening thereof is limited by at least part of the cradle 300, for example, the cover portion 350. Through this, the opening and closing manipulation of the port cover 296 for opening or closing the second connection port 292b will be limited.

The cover portion 350 is protruded from the body in a direction opposite to the recessed direction of the mounting portion 320, and the end portion thereof is configured to be bent to cover the port cover 296. The cover portion 350 may be formed of a plate member, and made of a soft material to be easily bent in the bending direction.

Referring to the drawings, if the terminal body is mounted on the cradle 300, then the first connection port 292a is electrically connected to the power supply terminal 330 of the cradle 300 as well as the second connection port 292b is covered by at least part of the cradle 300, thereby preventing double charge of the terminal.

Hereinafter, according to another embodiment of the present invention, a mechanism capable of preventing double charge will be described.

Figure 8:
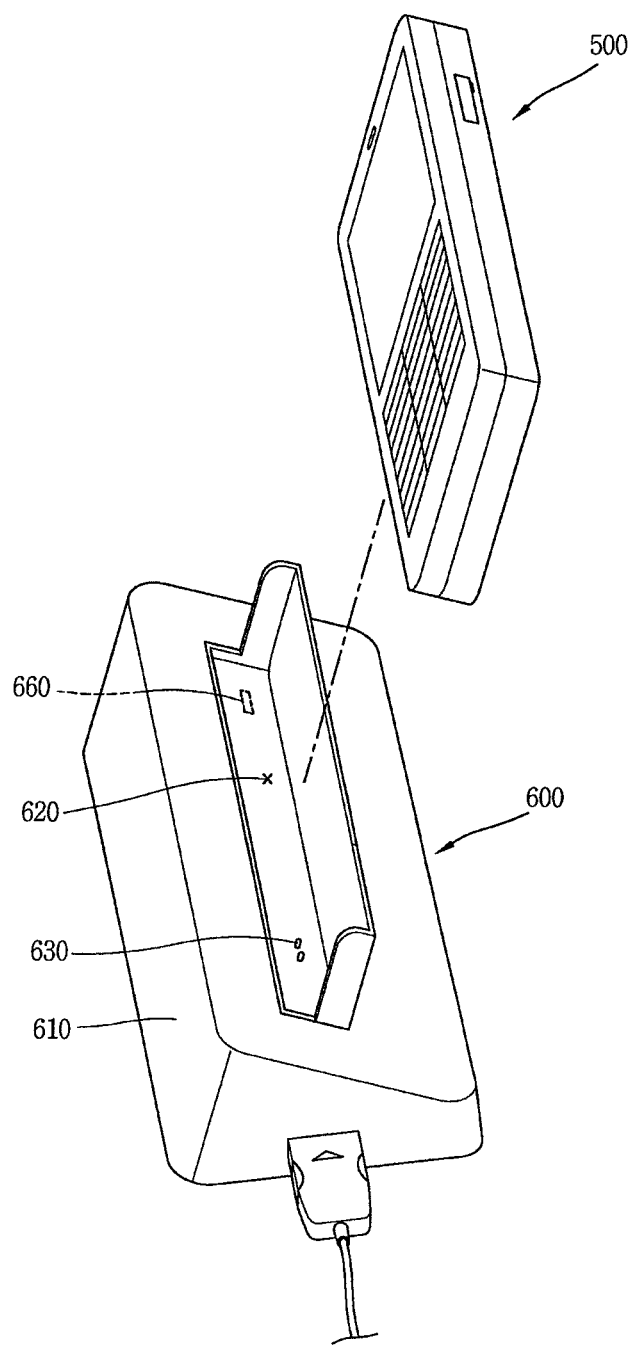
FIG. 8 is a front perspective view illustrating another example of a terminal system associated with the present invention.
Figure 9:
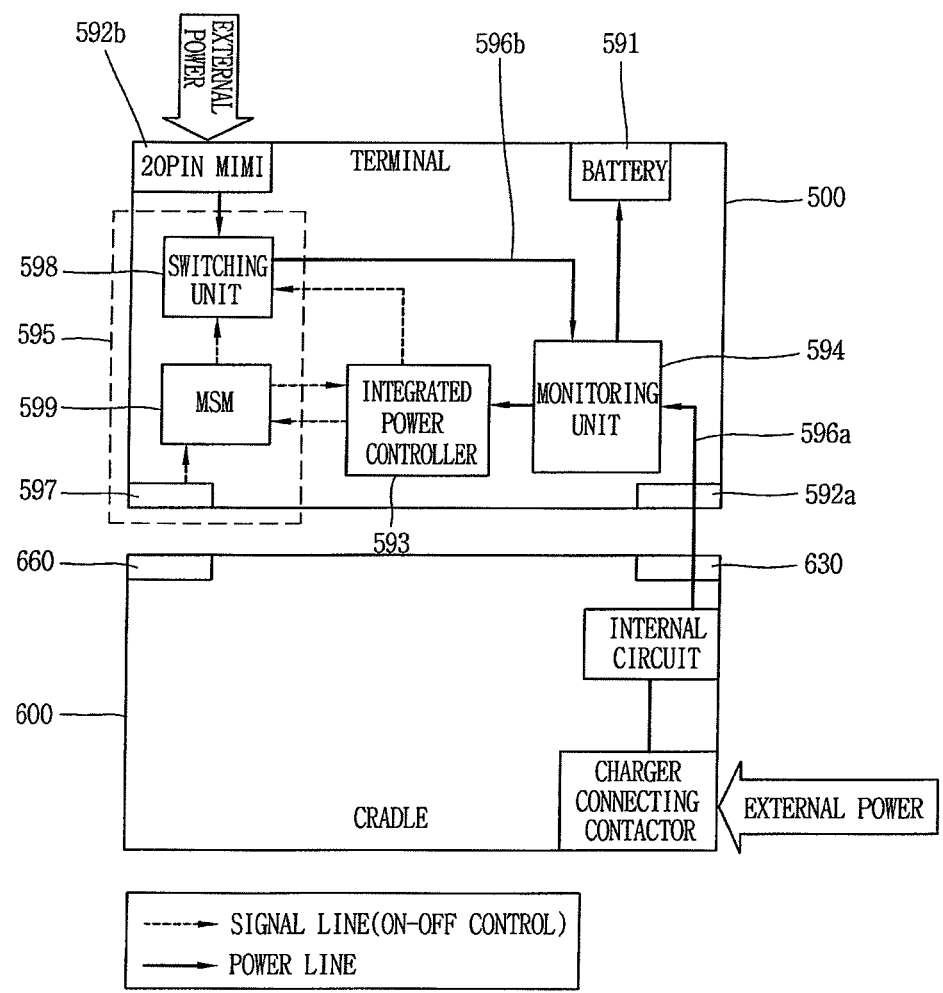
FIG. 9 is a block diagram illustrating the power supply operation associated with a mobile terminal and a cradle in FIG. 8.

FIG. 8 is a front perspective view illustrating another example of a terminal system associated with the present invention, and FIG. 9 is a block diagram illustrating the power supply operation associated with a mobile terminal and a cradle in FIG. 8. Hereinafter, the description for the same or similar construction as the embodiment illustrated with reference to FIGS. 4 through 7 will be omitted.

Referring to FIG. 9, a first connection port 592a of the terminal 500 is electrically connected to a battery 591 along a first power supply path 596a, and a second connection port 592b disposed at a different position from the first connection port 592a is electrically connected to the battery 591 along a second power supply path 596b.

A monitoring unit 594 is configured to monitor battery charge, and electrically connected to the battery 591. More specifically, the monitoring unit 594 receives power inputted from the first connection port 592a or second connection port 592b to supply to an integrated power controller 593 and the battery 591, and detects the level of a current flowing through a resistor of the monitoring circuit to transfer the information (ADC value) to a MSM controller 599.

The integrated power controller 593 is connected to electronic elements mounted on the terminal body to control power supply to the electronic elements, and the monitoring unit 594 transfers power supplied through either one of the first and the second power supply path 596a, 596b to the integrated power controller 593.

The first and the second power supply path 596a, 596b are formed to be connected from the first and the second connection port 592a, 592b to the monitoring unit 594, respectively.

As illustrated in the drawing, the first power supply path 596a may be a path that connects the first connection port 592a, the charge monitoring unit 594, and the battery 591. The second power supply path 596b may be an electrical wiring that connects the second connection port 592b, the switching unit 598, the monitoring unit 594, and the battery 591.

As illustrated in the drawing, the terminal 500 may include a power supply controller 595. The power supply controller 595 is configured to disconnect the second power supply path 596b if the terminal body is mounted on a cradle 600. However, the present invention will not be limited to this. If power is supplied to the first connection port 529a, then the power supply controller 595 may be formed to disconnect the second power supply path 596b by detecting the power.

The power supply controller 595 may include a detection unit 597, a switching unit 598, and a MSM controller 599.

The detection unit 597 may be formed to detect that the body is mounted on the cradle 600. Referring to FIGS. 8 and 9, the cradle 600 may include a body 610, a mounting portion 620, and power supply terminals 630, but a cover portion will not be formed differently from the previous embodiment.

A magnet 660 is built in the cradle 600, and a detection sensor for generating a detection signal if the magnet 660 mounted on the cradle 600 approaches is mounted on the terminal body. Referring to FIG. 9, the detection sensor may be an example of the detection unit 596, and through this it may be possible to detect that the terminal 500 has been mounted on the cradle 600.

The switching unit 598 may be disposed on the second power supply path 596b to be switched to connect or disconnect the power supply.

The MSM controller 599 may be connected to the detection unit 596 and the switching unit 598 to control an overall operation of the mobile terminal. The MSM controller 599 controls the switching unit 598 to cut off the second power supply path 596b if mounting to the cradle 600 of the terminal body is detected. In this manner, the detection unit 596 detects that the terminal has been mounted on the cradle, and the MSM controller 599 controls the switching unit 598 to cut off the second power supply path 596b, and thus it may be possible to prevent double charge all the time at a state that the terminal is mounted on the cradle.

Figure 10A:
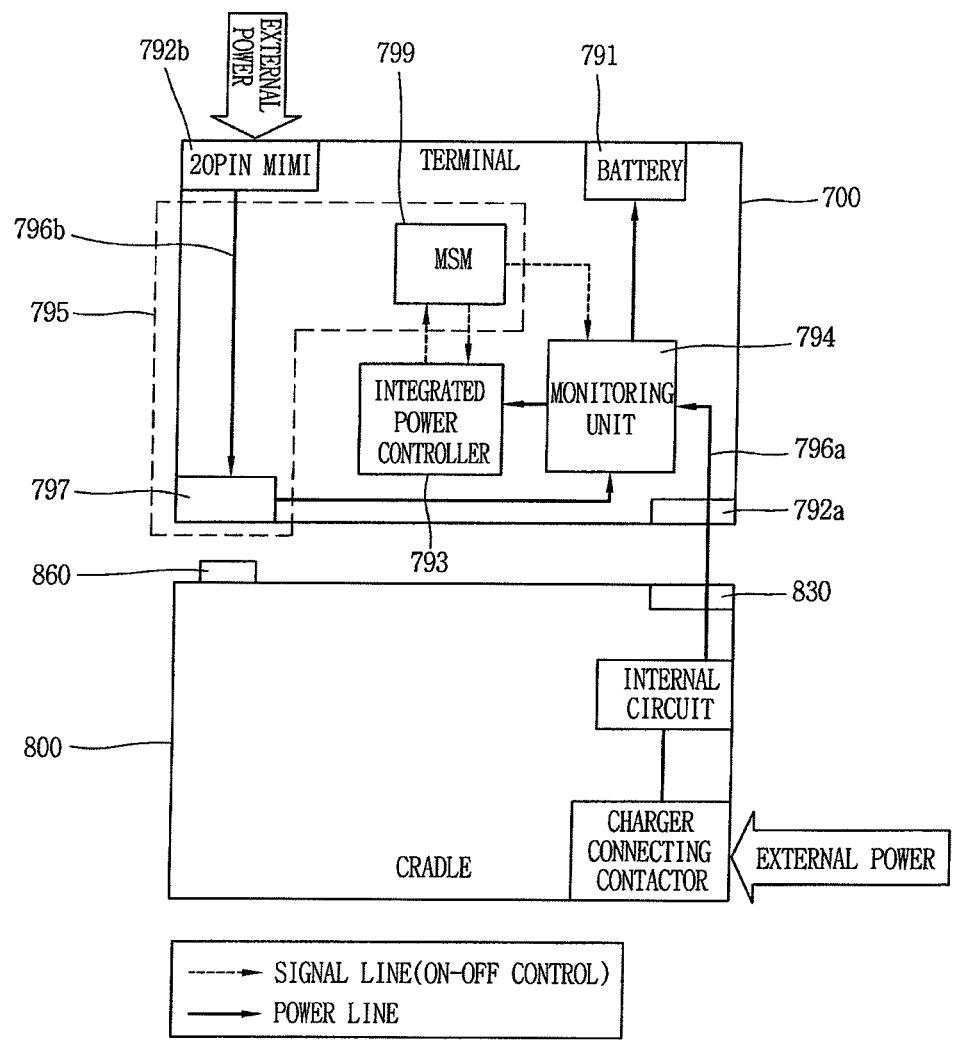
FIGS. 10a and 10b are block diagrams illustrating other examples of a mobile terminal and a cradle associated with the present invention.
Figure 10B:
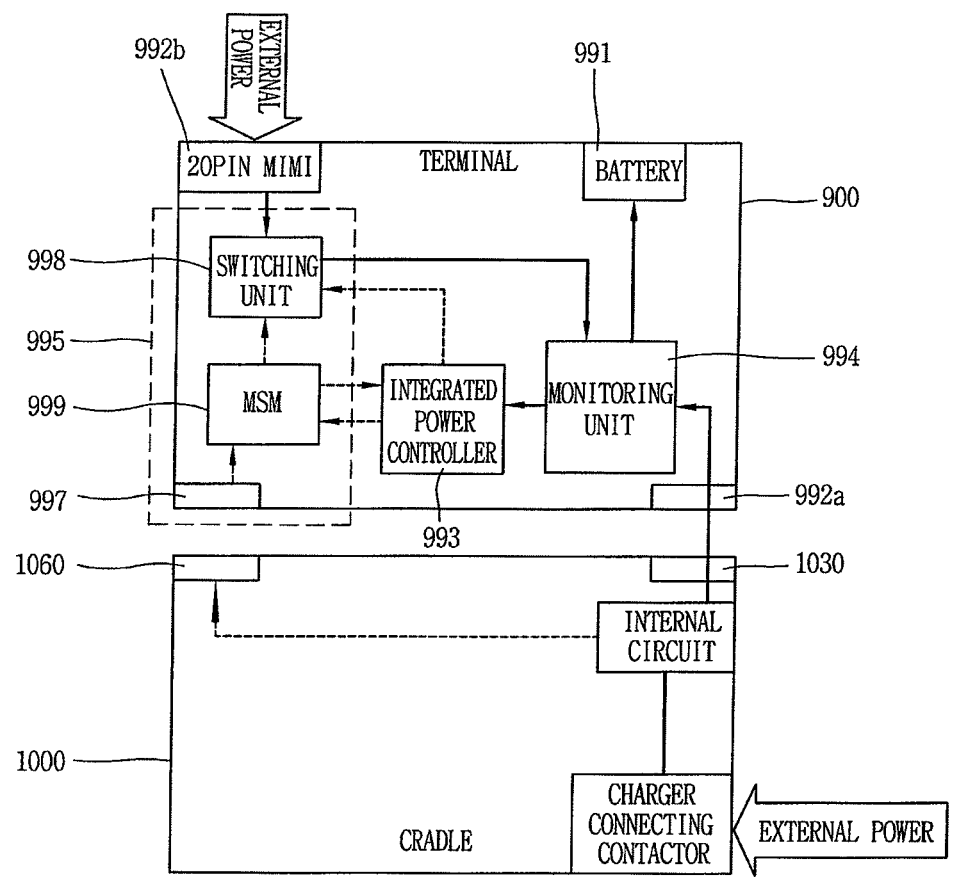

FIGS. 10a and 10b are block diagrams illustrating other examples of a mobile terminal and a cradle associated with the present invention.

Referring to FIG. 10a, a power supply controller 795 may include a cut-off switch 797 and MSM controller 799.

A second power supply path 796b is connected to a second connection port 792b, a cut-off switch 797, a monitoring unit 794, and a battery 791. The cut-off switch 797 is exposed to one surface of the terminal body, and disposed on the second power supply path 796b, and switched to cut off the second power supply path 796b if pressure is applied.

The cradle 800, which includes power supply terminals 830 is formed to press the cut-off switch 797 if the terminal body is mounted thereon. For example, a protrusion 860 may be formed at a position corresponding to the cut-off switch 797 on the mounting portion of the cradle 800 to press the cut-off switch.

Referring to FIG. 10b, a power supply controller 995 may include a signal generation unit 997 for generating a supply signal if power is supplied to a first connection port 992b. The signal generation unit 997 may be, for example, a terminal for signal recognition mounted on the terminal, and a terminal for signal transmission 1060 corresponding to the terminal for recognition may be disposed at a cradle 1000, which includes power supply terminals 1030.

For example, if the terminal 900, which includes integrated power controller 993, is mounted on the cradle 1000, then the terminal for recognition receives a signal from an internal circuit of the cradle to change the state to HIGH or LOW, and the MSM controller 999 detects this to determine the mounted state. If it is determined that the terminal is mounted thereon, then the MSM controller 999 controls the switching unit 998 to be cut off, thereby preventing power received from the second connection port 992a from being supplied to the monitoring unit 994 and the battery 991. As a result, only power received from the cradle 1000 is supplied to the monitoring unit 994 and the battery 991.

If the terminal 900 is removed from the cradle 1000, then the terminal for recognition is restored to an initial state, and the controller controls the switching unit to be turned on, thereby supplying power received from the second connection port 992b to the monitoring unit 994 and the battery 991.

In this manner, the terminal is configured such that power cannot be supplied to the second connection port 992b if power is supplied to the first connection port 992a, and thus double charge of the mobile terminal can be limited. In particular, the prevention of double charge has important meaning in a fixed mobile convergence (FMC) terminal.

According to the present invention having the foregoing construction, it may be possible to limit double charge of a mobile terminal mounted on the cradle through the second connection port disposed at a different surface from the first connection port and covered by the cradle.

Furthermore, according to the present invention, an antenna may be formed to be deviated from the first connection port, and thus the performance of transmitting or receiving radio signals in a mobile terminal can be maintained even when the terminal is mounted on the cradle.

In addition, through a power supply controller that cuts off a second power supply path if power is supplied to the first connection port, thereby implementing a mobile terminal in which charging is possible with a plurality of methods, but double charge can be limited.

The configurations and methods according to the above-described embodiments will not be applicable in a limited way to the foregoing terminal, and all or part of each embodiment may be selectively combined and configured to make various modifications thereto.

What is claimed is:

1. A mobile terminal, comprising:
    a body having a battery and configured to be mounted on a cradle having power supply terminals;
    a first connection port disposed at one surface of the body and configured to be electrically connected to the power supply terminals of the cradle when the body is mounted on the cradle;
    a second connection port disposed at another surface of the body, the another surface being different from the one surface of the body and configured to be covered by at least part of the cradle when the body is mounted on the cradle;
    a power supply path arranged to electrically connect the battery to the first connection port and the second connection port so as to charge the battery when power is supplied to the first and the second connection port;
    a first antenna configured to transmit and/or receive radio signals to and/or from a first base station; and
    a second antenna configured to transmit and/or receive radio signals to and/or from a second base station,
    wherein the body comprises a front surface portion, a rear surface portion, and a lateral surface portion, and
    wherein the first antenna is mounted on the body between the first and the second connection port along the lateral surface portion, and the second antenna is mounted on the body adjacent to the lateral surface portion.

2. The mobile terminal of claim 1,
    wherein the one surface and the another surface are located on the lateral surface portion.

3. The mobile terminal of claim 2,
    wherein the one surface and the another surface face in opposite directions, and
    wherein the first antenna is disposed adjacent to a surface intersected by the one surface and the another surface.

4. The mobile terminal of claim 3, further comprising:
    a window and a keypad configured to receive control commands, the window and the keypad being disposed at the front surface portion,
    wherein the battery is mounted on the rear surface portion, and
    wherein the first antenna is formed to be deviated from the keypad and battery in a direction passing from the front surface portion to the rear surface portion.

5. The mobile terminal of claim 3, further comprising:
    a through hole through which the first connection port is passed, the through hole being formed on the lateral surface portion to expose the first connection port to the outside.

6. The mobile terminal of claim 2,
    wherein the body is formed to be mounted on a mounting portion recessed at the body of the cradle, and
    wherein the one surface is accommodated in the mounting portion and the second connection port is formed to be covered by a cover portion protruding from a body of the cradle when the body is mounted on the mounting portion.

7. The mobile terminal of claim 1,
    wherein the first connection port is exposed to an outside at one surface of the body, and
    wherein the second connection port is formed to be opened or closed by a port cover mounted on the another surface of the body.

8. The mobile terminal of claim 7, wherein the port cover is formed such that opening or closing thereof is limited by at least part of the cradle when the body is mounted on the cradle.

9. A mobile terminal, comprising:
    a body having a battery and formed to be mounted on a cradle;
    a first connection port disposed at one surface of the body and configured to be electrically connected to the battery along a first power supply path;
    a second connection port electrically connected to the battery along a second power supply path, and disposed at another position different from the first connection port; and
    a power supply control device configured to cut off the second power supply path when the body is mounted on the cradle or to cut off the second power supply path when power is supplied to the first connection port,
    wherein the power supply control device comprises:
    a detection unit configured to detect that the body is mounted on the cradle;
    a switching unit disposed on the second power supply path and configured to be switched to connect or disconnect the power supply; and
    a controller connected to the detection unit and the switching unit, the controller configured to control the switching unit to cut off the second power supply path when mounting to the cradle of the body is detected.

10. The mobile terminal of claim 9, wherein the detection unit comprises a detection sensor mounted on the body and configured to generate a detection signal when a magnet mounted on the cradle is within a predetermined distance of the detection sensor.

11. The mobile terminal of claim 9, further comprising:
    a monitoring unit on the body and configured to monitor a charge state of the battery,
    wherein the first and the second power supply path are arranged to connect the first and the second connection port to the monitoring unit, respectively.

12. The mobile terminal of claim 11, further comprising:
    an integrated power controller connected to electronic elements mounted on the body and configured to control power supplied to the electronic elements,
    wherein the monitoring unit is configured to transfer power supplied through either one of the first and the second power supply path to the integrated power controller.

13. The mobile terminal of claim 9, further comprising:
    a first antenna configured to transmit or receive radio signals,
    wherein the first antenna is mounted on the body and disposed to be deviated from a region adjacent to a surface at which the first connection port is disposed.

14. A mobile terminal, comprising:
a body having a battery and formed to be mounted on a cradle;
a first connection port disposed at one surface of the body and configured to be electrically connected to the battery along a first power supply path;
a second connection port electrically connected to the battery along a second power supply path, and disposed at another position different from the first connection port; and
a power supply control device configured to cut off the second power supply path when the body is mounted on the cradle or to cut off the second power supply path when power is supplied to the first connection port,
wherein the power supply control device comprises a cut-off switch exposed on a surface of the body and disposed on the second power supply path, the cut-off switch being configured to be switched to cut off the second power supply path when pressure is applied to the cut-off switch.

15. The mobile terminal of claim 14, wherein the cradle is formed to press the cut-off switch when the body is mounted thereon.

16. A mobile terminal, comprising:
a body having a battery and formed to be mounted on a cradle;
a first connection port disposed at one surface of the body and configured to be electrically connected to the battery along a first power supply path;
a second connection port electrically connected to the battery along a second power supply path, and disposed at another position different from the first connection port; and
a power supply control device configured to cut off the second power supply path when the body is mounted on the cradle or to cut off the second power supply path when power is supplied to the first connection port,
wherein the power supply control device comprises:
a signal generation unit configured to generate a supply signal when power is supplied to the first connection port;
a switching unit disposed on the second power supply path and configured to connect or disconnect the power supply; and
a controller connected to the signal generation unit and the switching unit, the controller configured to control the switching unit to cut off the second power supply path when the supply signal is received.

17. A terminal system, comprising:
a mobile terminal having a battery and configured to perform radio communication;
a cradle including a body, a mounting portion recessed at the body to mount a body of the terminal, and power supply terminals disposed at the mounting portion;
a first connection port disposed at one surface of the body of the terminal and configured to be electrically connected to the power supply terminals of the cradle when the body is mounted on the cradle;
a second connection port disposed at another surface of the body of the terminal different from the one surface of the body of the terminal, and formed to be covered by a cover portion protruding from the body of the cradle when the body of the terminal is mounted on the cradle;
a power supply path arranged to electrically connect the battery to the first and the second connection port respectively to charge the battery when power is supplied to the first and the second connection port;
a first antenna configured to transmit and/or receive radio signals to and/or from a first base station; and
a second antenna configured to transmit and/or receive radio signals to and/or from a second base station,
wherein the body of the terminal comprises a front surface portion, a rear surface portion, and a lateral surface portion, and
wherein the first antenna is mounted on the body of the terminal between the first and the second connection port along the lateral surface portion, and the second antenna is mounted on the body of the terminal adjacent to the lateral surface portion.

* * * * *